United States Patent
Menda et al.

(10) Patent No.: US 11,712,668 B2
(45) Date of Patent: Aug. 1, 2023

(54) FILTER MEMBRANE AND DEVICE

(71) Applicant: GAMBRO LUNDIA AB, Lund (SE)

(72) Inventors: Ralf Menda, Senden (DE); Evelyn Grossmann, Esslingen (DE); Carina Zweigart, Schoemberg (DE); Bernd Bauer, Bietigheim-Bissingen (DE); Michael Schuster, Bietigheim-Bissingen (DE)

(73) Assignee: GAMBRO LUNDIA AB, Lund (SE)

( * ) Notice: Subject to any disclaimer, the term of this patent is extended or adjusted under 35 U.S.C. 154(b) by 0 days.

(21) Appl. No.: 16/630,998

(22) PCT Filed: Jul. 18, 2018

(86) PCT No.: PCT/EP2018/069458
§ 371 (c)(1),
(2) Date: Jan. 14, 2020

(87) PCT Pub. No.: WO2019/016246
PCT Pub. Date: Jan. 24, 2019

(65) Prior Publication Data
US 2020/0222858 A1    Jul. 16, 2020

(30) Foreign Application Priority Data

Jul. 19, 2017 (EP) .................................. 17182171

(51) Int. Cl.
| | | |
|---|---|---|
| B01D 69/08 | (2006.01) | |
| B01D 65/02 | (2006.01) | |
| B01D 67/00 | (2006.01) | |
| B01D 69/02 | (2006.01) | |
| B01D 71/44 | (2006.01) | |
| B01D 71/68 | (2006.01) | |
| B01D 71/82 | (2006.01) | |

(52) U.S. Cl.
CPC .......... *B01D 69/08* (2013.01); *B01D 65/022* (2013.01); *B01D 67/0016* (2013.01); *B01D 67/0095* (2013.01); *B01D 69/02* (2013.01); *B01D 71/44* (2013.01); *B01D 71/68* (2013.01); *B01D 71/82* (2013.01); *B01D 2321/08* (2013.01); *B01D 2321/346* (2013.01); *B01D 2323/12* (2013.01); *B01D 2325/026* (2013.01); *B01D 2325/16* (2013.01); *B01D 2325/24* (2013.01); *B01D 2325/48* (2013.01)

(58) Field of Classification Search
CPC ...... B01D 69/08; B01D 69/081; B01D 71/68; B01D 2325/026; B01D 71/28; B01D 2321/346; B01D 71/44; B01D 71/441
See application file for complete search history.

(56) References Cited

FOREIGN PATENT DOCUMENTS

| | | |
|---|---|---|
| EP | 2253370 | 11/2010 |
| JP | H04118034 | 4/1992 |
| JP | 2003320229 | 11/2003 |
| JP | 2003320229 A * | 11/2003 |
| JP | 2005230407 | 9/2005 |
| WO | WO2006/106133 | 10/2006 |

OTHER PUBLICATIONS

Maniwa, T. et al. "Modified hollow fiber membrane for use as film for blood purification, contains copolymer of vinyl polymerizable monomer, polysulfone base polymer having zwitterion, and another vinyl polymerizable monomer," WPI / Thomson, Nov. 11, 2003 (XP003026077).
PCT Search Report and Written Opinion prepared for PCT/EP2018/069458, completed Sep. 17, 2018.

* cited by examiner

*Primary Examiner* — Ryan B Huang
(74) *Attorney, Agent, or Firm* — Barnes & Thornburg LLP

(57) ABSTRACT

The present disclosure relates to a microporous hollow fiber filter membrane having a large inner diameter and a thin wall. The fiber can be used for sterile filtration of liquids or removal of particles from liquids. The disclosure further relates to a method for producing the membrane and a filter device comprising the membrane.

20 Claims, 3 Drawing Sheets

FILTER MEMBRANE AND DEVICE

CROSS-REFERENCE TO RELATED APPLICATIONS

This application is the U.S. national phase of PCT/EP2018/069458, filed on Jul. 18, 2018, which claims the benefit of European Patent Application Serial Number 17182171.3, filed on Jul. 19, 2017, the entire disclosures of both of which are incorporated herein by reference.

TECHNICAL FIELD

The present disclosure relates to a microporous hollow fiber filter membrane having a large inner diameter and a thin wall. The fiber can be used for sterile filtration of liquids or removal of particles from liquids. The disclosure further relates to a method for producing the membrane and a filter device comprising the membrane.

BACKGROUND OF THE INVENTION

WO 2004/056459 A1 discloses a permselective asymmetric membrane suitable for hemodialysis, comprising at least one hydrophobic polymer, e.g. polyethersulfone, and at least one hydrophilic polymer, e.g. polyvinylpyrrolidone. The outer surface of the hollow fiber membrane has pore openings in the range of 0.5 to 3 µm and the number of pores in the outer surface is in the range of 10,000 to 150,000 pores per $mm^2$. Pore size of the membrane is in the range of 5 to 20 nm. The internal diameter of the membrane is less than 500 µm and its wall strength is less than 90 µm.

US 2014/0175006 A1 discloses a composite membrane module with hollow fiber membranes comprising a hollow fiber support layer and an active layer on the surface of the support layer. The active layer is formed by interfacial polymerization of an amine and an acyl halide on the support. The support layer may have an inner diameter of about 0.1 to about 3.0 mm and a thickness of about 10 to about 500 µm, e.g., 50 to 200 µm. In the examples, a support layer having an inner diameter of 0.5 to 1.0 mm and a thickness of 0.1 to 0.15 mm was used.

EP 0 998 972 A1 discloses self-supporting capillary membranes which are longitudinally reinforced by continuous reinforcing fibers incorporated in the wall of the capillary membrane. The inner diameter of the capillary membranes generally is from 0.2 to 6 mm and particularly from 0.4 to 3 mm. The wall thickness is generally from 0.1 to 2 mm and particularly from 0.2 to 1 mm. In the comparative examples, membranes without reinforcing fibers are disclosed which have an inner diameter of 1.5 mm and a wall thickness of 0.5 mm; or an inner diameter of 3 mm and a wall thickness of 1 mm, respectively.

SUMMARY OF THE INVENTION

The present disclosure provides a porous hollow fiber membrane showing a sponge structure and having a mean flow pore size, determined by capillary flow porometry, which is larger than 0.2 µm; and comprising polyethersulfone, polyvinylpyrrolidone and a polymer bearing ammonium groups. The present disclosure also provides a continuous solvent phase inversion spinning process for making the porous hollow fiber membrane. The present disclosure further provides filter devices comprising the porous hollow fiber membrane. The filter devices can be used for sterile filtration of liquids, removal of bacteria and/or endotoxins from liquids, or removal of particles from liquids.

DETAILED DESCRIPTION OF THE INVENTION

Figure 1:
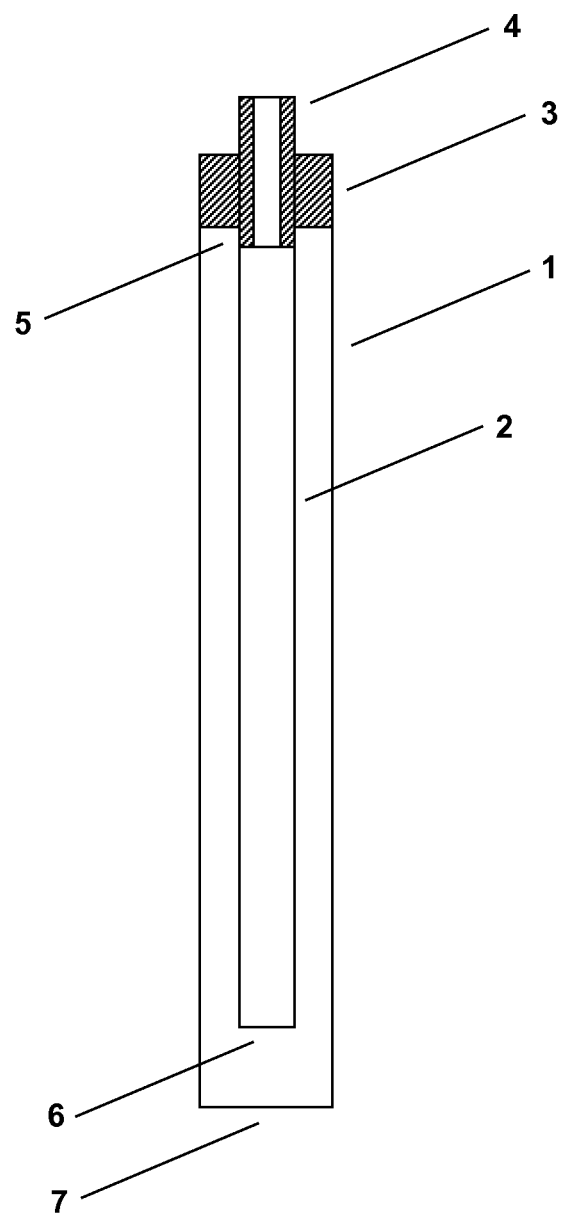
FIG. 1 shows a schematic cross-sectional view of an embodiment of a filter device according to the present disclosure.

In one aspect of the present invention, a porous hollow fiber membrane having a sponge-like structure is provided. The membrane has a mean flow pore size, determined by capillary flow porometry, which is larger than 0.2 µm. In one embodiment, the mean flow pore size is in the range of from 0.2 to 0.4 µm. In another embodiment, the mean flow pore size is larger than 0.3 µm, e.g., in the range of from 0.3 to 0.7 µm. In still another embodiment, the mean flow pore size is larger than 1 µm, e.g., in the range of from 1 to 10 µm, or in the range of from 1 to 5 µm.

Capillary flow porometry is a liquid extrusion technique in which at differential gas pressure the flow rates through wet and dry membranes are measured. Before measurement the membrane is immersed in a low surface tension liquid (e.g., a perfluoroether commercially available under the trade name Porefil®) to ensure that all pores including the small ones are filled with the wetting liquid. By measuring the pressure at which the liquid is pressed out of the pores its corresponding diameter can be calculated using the Laplace equation. With this method the pore size distribution is determined of those pores that are active in the mass transport. Dead end and isolated pores are omitted. The hollow fiber membranes are measured inside-out.

Laplace Equation:

$$Dp = 4Y \cos \theta / \Delta P$$

Dp=diameter pores [m]
Y=surface tension [N/m]; for Porefil® 0.016 [N/m]
$\Delta P$=pressure [Pa]
Cos θ=contact angle; by complete wetting cos θ=1

The membrane comprises polyethersulfone (PESU), polyvinylpyrrolidone (PVP), and at least one polymer bearing ammonium groups selected from polyalkyleneoxides bearing ammonium groups, in particular quaternary ammonium groups, and polyvinylpyridines or copolymers of vinylpyridine and styrene bearing ammonium groups, in particular quaternary ammonium groups.

Suitable polymers bearing ammonium groups include polyalkyleneoxides bearing ammonium groups, in particular quaternary ammonium groups, and polyvinylpyridines or copolymers of vinylpyridine and styrene bearing ammonium groups, in particular quaternary ammonium groups, e.g., N-alkylpyridinium groups.

Suitable counter ions for the ammonium groups include chloride, bromide, sulfate, hydrogen sulfate, trifluoromethane sulfonate, carbonate, hydrogen carbonate, phosphate, hydrogen phosphate, dihydrogen phosphate, acetate, lactate, and citrate. In one embodiment, the counter ion is chloride. In another embodiment, the counter ion is bromide. In still another embodiment, the counter ion is sulfate.

Examples of suitable polyalkyleneoxides include polymers of ethylene oxide, propylene oxide, butylene oxide, epichlorohydrin, and their copolymers. In one embodiment, the polyalkyleneoxide is a block copolymer of ethylene oxide and epichlorohydrin. In one embodiment, the polyalkylenoxide has a number average molecular weight in the range of from 50 to 2,000 kDa, e.g., 100 to 250 kDa, for instance, 150 to 200 kDa.

The polyalkyleneoxide polymers are functionalized with ammonium groups. In one embodiment, the ammonium groups are quaternary ammonium groups.

In one embodiment, a polymer bearing ammonium groups is obtained by reacting a block copolymer of ethylene oxide and epichlorohydrin with at least one amine to form a polyalkylenoxide polymer featuring ammonium groups. Examples of suitable amines include primary, secondary, and tertiary amines. The amines can be aliphatic, cycloaliphatic, aromatic-aliphatic, or aromatic. In one embodiment, a primary or secondary amine comprising alkyl or benzyl moieties is used. In another embodiment, a tertiary amine comprising alkyl or benzyl moieties is used. In one embodiment, a polymer bearing quaternary ammonium groups is obtained by reacting a block copolymer of ethylene oxide and epichlorohydrin with at least one tertiary amine to form a polyalkylenoxide polymer featuring quaternary ammonium groups. In one embodiment, the block copolymer is reacted with two different tertiary amines. Examples of suitable tertiary amines include aliphatic amines, e.g., trialkylamines like triethylamine, tripropylamine, benzyldimethylamine, tribenzylamine; cycloaliphatic amines, e.g., N-alkylpiperidines, N,N-dialkylpiperazines, N-alkylpyrrolidines, and N,N-dialkylpyrazolines; and aromatic amines, e.g., pyridine, pyrazine, pyrrole, and pyrazole. In a particular embodiment, the tertiary amine is 1,4-diazabicyclo[2.2.2]octane ("DABCO"). In another particular embodiment, the tertiary amine is 1-azabicyclo[2.2.2]octane.

In one embodiment, all the chlorine functions in the copolymer are reacted with the tertiary amine(s). In another embodiment, only a fraction of the chlorine functions in the copolymer are reacted with the tertiary amine(s), for instance, 10 to 90 mol %, or 20 to 70 mol %, or 30 to 50 mol %.

In one embodiment, the polymer bearing ammonium groups corresponds to the formula

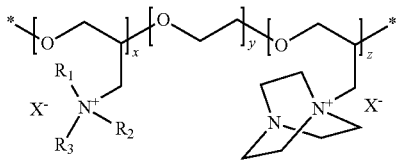

wherein
$R_1$, $R_2$, $R_3$ are individually selected from H, alkyl, benzyl;
$X^-$ is $Cl^-$;
with
$0 \leq x \leq 0.9$;
$0 \leq y \leq 0.8$;
$0 \leq z \leq 0.9$;
and $x+y+z=1$.

In another embodiment, a polymer bearing quaternary ammonium groups is obtained by reacting a polyvinylpyridine or a copolymer of vinylpyridine and styrene with an alkylating agent, e.g., an alkyl sulfate like dimethyl sulfate or diethyl sulfate. In one embodiment, 1 to 20 mol %, e.g., 2 to 10 mol %, or 3 to 8 mol % of the pyridine groups in the polyvinylpyridine are N-alkylated. In one embodiment, the counter ion of the N-alkylpyridinium groups is sulfate. In one embodiment, the polymer bearing quaternary ammonium groups has a weight average molecular weight in the range of from 10 to 500 kDa, e.g., 150 to 200 kDa.

In one embodiment, the polymer bearing quaternary ammonium groups corresponds to the formula

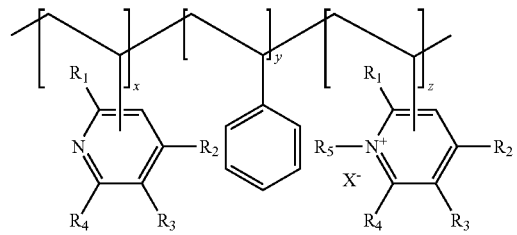

wherein
$R_1$, $R_2$, $R_3$, $R_4$ are individually selected from H, alkyl, benzyl;
$R_5$ is selected from alkyl, benzyl;
$X^-$ is selected from $Cl^-$, $Br^-$, $SO_4^{2-}$;
with
$0 \leq x \leq 1$;
$0 \leq y \leq 0.5$;
$0 \leq z \leq 0.5$;
and $x+y+z=1$.

Examples of suitable polyethersulfones include polyethersulfones having a weight average molecular weight of about 70,000 to 100,000 Da. In one embodiment, a polyethersulfone having a weight average molecular weight $M_w$ in the range of from 90 to 95 kDa is used. An example is a polyethersulfone having a weight average molecular weight $M_w$ of 92 kDa and a polydispersity $M_w/M_n$ of 3. In another embodiment, a polyethersulfone having a weight average molecular weight $M_w$ in the range of from 70 to 80 kDa is used. An example is a polyethersulfone having a weight average molecular weight $M_w$ of 75 kDa and a polydispersity $M_w/M_n$ of 3.4.

Suitable polyvinylpyrrolidones include homopolymers of vinylpyrrolidone having a weight average molecular weight in the range of from 50 kDa to 2,000 kDa. These homopolymers generally have a number average molecular weight in the range of from 14 kDa to 375 kDa. Examples of suitable polyvinylpyrrolidones for preparing the membranes of the invention are Luvitec® K30, Luvitec® K85, Luvitec® K90, and Luvitec® K90HM, respectively, all available from BASF SE.

In one embodiment of the invention, the polyvinylpyrrolidone comprised in the porous hollow fiber membrane consists of a high ($\geq$100 kDa) and a low (<100 kDa) weight average molecular weight component.

An example of a suitable polyvinylpyrrolidone having a weight average molecular weight <100 kDa is a polyvinylpyrrolidone having a weight average molecular weight of 50 kDa and a number average molecular weight of 14 kDa. Such a product is available from BASF SE under the trade name Luvitec® K30.

Examples of suitable polyvinylpyrrolidones having a weight average molecular weight >100 kDa include poylvinylpyrrolidones having a weight average molecular weight in the range of about 1,000 to 2,000 kDa, e.g., 1,100 to 1,400 kDa, or 1,400 to 1,800 kDa; a number average molecular weight of about 200 to 400 kDa, e.g., 250 to 325 kDa, or 325 to 325 kDa; and a polydispersity $M_w/M_n$ of about 4 to 5, for instance, 4.3 to 4.4, or 4.3 to 4.8.

One embodiment of the invention uses a polyvinylpyrrolidone homopolymer having a weight average molecular weight of about 1,100 kDa; and a number average molecular weight of about 250 kDa.

Another embodiment of the invention uses a polyvinylpyrrolidone homopolymer having a weight average molecular weight of about 1,400 kDa; and a number average molecular weight of about 325 kDa.

Still another embodiment of the invention uses a polyvinylpyrrolidone homopolymer having a weight average molecular weight of about 1,800 kDa; and a number average molecular weight of about 375 kDa.

In one embodiment, the membrane has an inner diameter of from 2,300 to 4,000 μm and a wall strength of from 150 to 500 μm. In one embodiment, the inner diameter is larger than 3,000 μm and smaller than or equal to 3,700 μm and the wall strength is in the range of from 180 to 320 μm.

In another embodiment, the inner diameter is 2,300 to 2,500 μm and the wall strength is 180 to 320 μm. In yet another embodiment, the inner diameter is 2,900 to 3,400 μm and the wall strength is 180 to 320 μm.

The ratio of the inner diameter of the membrane to its wall strength is larger than 10. In one embodiment, the ratio of inner diameter to wall strength is larger than 15. Membranes having a large ratio of inner diameter to wall strength, i.e. thin-walled membranes, are more flexible and easily deformable. These membranes are less prone to form kinks on bending than thick-walled membranes. The ends of the thin-walled hollow fibers also can readily be closed by crimping to produce dead-end filter elements.

In one embodiment, the membrane shows a burst pressure, determined as described in the methods section below, of at least 2.0 bar (g), for instance, at least 2.5 bar (g), or even more than 3 bar (g). In one embodiment, the membrane shows a burst pressure in the range of from 2 to 5 bar (g).

In one embodiment, the membrane has a bacterial log reduction value (LRV) greater than 7. In another embodiment, the membrane has an LRV greater than 8. The LRV is tested with suspensions of *Brevundimonas diminuta* (BD) ATCC 19146, as described in the methods section below.

In one embodiment, the membrane has an endotoxin log reduction value (LRV) of greater than 3. In another embodiment, the membrane has an LRV of greater than 3.5. In still another embodiment, the membrane has an LRV of at least 4. The LRV is tested with suspensions of *Brevundimonas diminuta* (BD) ATCC 19146, as described in the methods section below.

The present disclosure also provides a continuous solvent phase inversion spinning process for preparing a porous hollow fiber membrane, comprising the steps of
   a) dissolving at least one polyethersulfone, at least one polyvinylpyrrolidone, and at least one polymer bearing ammonium groups, in N-methyl-2-pyrrolidone to form a polymer solution;
   b) extruding the polymer solution through an outer ring slit of a nozzle with two concentric openings into a precipitation bath; simultaneously
   c) extruding a center fluid through the inner opening of the nozzle;
   d) washing the membrane obtained; and subsequently
   e) drying the membrane;
wherein the polymer solution comprises from 15 to 20 wt %, relative to the total weight of the polymer solution, of polyethersulfone, and from 10 to 15 wt %, relative to the total weight of the polymer solution, of polyvinylpyrrolidone, and from 0.03 to 2 wt %, relative to the total weight of the solution, of at least one polymer bearing ammonium groups selected from polyalkyleneoxides bearing ammonium groups, in particular quaternary ammonium groups, and polyvinylpyridines or copolymers of vinylpyridine and styrene bearing ammonium groups, in particular quaternary ammonium groups.

Suitable polymers bearing ammonium groups include polyalkyleneoxides bearing quaternary ammonium groups and polyvinylpyridines bearing quaternary ammonium groups, e.g., N-alkylpyridinium groups.

Suitable counter ions for the ammonium groups include chloride, bromide, sulfate, hydrogen sulfate, trifluoromethane sulfonate, carbonate, hydrogen carbonate, phosphate, hydrogen phosphate, dihydrogen phosphate, acetate, lactate, and citrate. In one embodiment, the counter ion is chloride. In another embodiment, the counter ion is bromide. In still another embodiment, the counter ion is sulfate.

In one embodiment, the polymer solution comprises from 0.03 to 2 wt %, e.g., 0.05 to 1 wt %, or 0.1 to 0.5 wt %, relative to the total weight of the solution, of a polymer bearing ammonium groups. In one embodiment, the ammonium groups are quaternary ammonium groups. In one embodiment, the polymer bearing ammonium groups has a number average molecular weight of 50 to 2,000 kDa, e.g., 100 to 250 kDa, for instance, 150 to 200 kDa. In another embodiment, the polymer bearing ammonium groups has a weight average molecular weight of 10 to 500 kDa, e.g., 150 to 200 kDa.

In one embodiment, the polymer bearing ammonium groups is a block copolymer of epichlorohydrin and alkylene oxide that has been reacted with a bifunctional amino compound, e.g. DABCO. In one embodiment, 30 to 50% of the chlorine atoms in the block copolymer of epichlorohydrin and alkylene oxide have been substituted by DABCO. In one embodiment, the ion exchange capacity of the polymer bearing ammonium groups is in the range of from 1.5 to 2.5 mmol/g, e.g., 1.7 to 2.1 mmol/g.

In another embodiment, the polymer bearing ammonium groups is a polyvinylpyridine having a weight average molecular weight of 150 to 200 kDa, wherein 3 to 8 mol % of the pyridine groups in the polyvinylpyridine have been transformed into N-alkylpyridinium groups with sulfate as counter ion.

The concentration of polyethersulfone in the polymer solution generally is in the range of from 15 to 20 wt %, for instance, 17 to 19 wt %.

In one embodiment, the polymer solution comprises a polyethersulfone having a weight average molecular weight $M_w$ in the range of from 90 to 95 kDa is used. An example is a polyethersulfone having a weight average molecular weight $M_w$ of 92 kDa and a polydispersity $M_w/M_n$ of 3. In another embodiment, polymer solution comprises a polyethersulfone having a weight average molecular weight $M_w$ in the range of from 70 to 80 kDa is used. An example is a polyethersulfone having a weight average molecular weight $M_w$ of 75 kDa and a polydispersity $M_w/M_n$ of 3.4.

The concentration of polyvinylpyrrolidone in the polymer solution generally is in the range of from 10 to 15 wt %, e.g., from 11 to 12 wt %.

In one embodiment of the process, the polymer solution comprises a high (≥100 kDa) and a low (<100 kDa) molecular weight PVP. In one embodiment, 50-60 wt %, e.g., 50-55 wt %, based on the total weight of PVP in the polymer solution, is high molecular weight component, and 40-60 wt %, e.g., 45-50 wt %, based on the total weight of PVP in the polymer solution, is low molecular weight component.

In one embodiment, the polymer solution comprises 5 to 6 wt % of a polyvinylpyrrolidone having a weight average molecular weight of 50 kDa; and 6 to 7 wt % of a polyvinylpyrrolidone having a weight average molecular weight of 1,100 kDa.

In one embodiment, the polymer solution comprises from 4 to 6 wt %, e.g., 5 wt %, relative to the total weight of the solution, of water.

In one embodiment of the process for preparing the membrane, the center fluid comprises 35 to 50 wt % of water and 50 to 65 wt % of NMP, for instance, 35 to 45 wt % of water and 55 to 65 wt % of NMP, or 40 to 50 wt % of water and 50 to 60 wt % of NMP, e.g., 40 wt % of water and 60 wt % of NMP, relative to the total weight of the center fluid.

In one embodiment of the process, the precipitation bath is comprised of water. In one embodiment of the process, the precipitation bath has a temperature in the range of from 70 to 99° C., for instance, 75 to 95° C., or 85 to 90° C.

In one embodiment of the process for preparing the membrane, the temperature of the spinneret is in the range of from 50 to 60° C., e.g., 52-56° C.

In one embodiment of the process, the distance between the opening of the nozzle and the precipitation bath is in the range of from 10 to 90 cm, e.g., 15 to 60 cm.

In one embodiment of the process, the spinning speed is in the range of 5 to 15 m/min, e.g., 8 to 13 m/min.

The membrane then is washed to remove residual solvent and low molecular weight components. In a particular embodiment of a continuous process for producing the membrane, the membrane is guided through several water baths. In certain embodiments of the process, the individual water baths have different temperatures. For instance, each water bath may have a higher temperature than the preceding water bath.

The membrane then is dried and subsequently sterilized. The sterilization step is important to increase the liquid permeability (Lp) of the hollow fiber membrane. Larger fluid flows can be achieved with a sterilized membrane, compared to a membrane that has not gone through the sterilization step. In one embodiment, the hollow fiber membrane subsequently is sterilized with gamma radiation. In a particular embodiment, radiation dose used is in the range of from 25 to 50 kGy, for instance, 25 kGy. In another embodiment, the hollow fiber membrane subsequently is sterilized with steam at a temperature of at least 121° C. for at least 21 min. After the sterilization step, the hollow fiber membrane shows a greatly increased hydraulic permeability.

The present disclosure also provides a filtration device comprising at least one hollow fiber membrane having the characteristics described above. In one embodiment, the filtration device comprises a single hollow fiber membrane. In one embodiment, the filtration device is a sterilization grade filter which is able to remove microbial contaminants from a liquid.

The filtration device comprises a tubular housing, the ends of the tubular housing defining an inlet and an outlet, respectively, of the device; at least one hollow fiber membrane disposed within the tubular housing, one end of the at least one hollow fiber membrane being connected to the inlet of the device, and the other end of the at least one hollow fiber membrane being sealed, e.g., by crimping. In one embodiment, the filtration device comprises a single hollow fiber membrane. In another embodiment, the filtration device comprises a plurality of hollow fiber membranes. In one embodiment, the number of hollow fiber membranes is in the range of from 3 to 20, for instance, from 5 to 10.

FIG. 1 shows a schematic cross-sectional view of one embodiment of the filtration device. A hollow fiber membrane 2 is disposed within a tubular housing 1. Connector 3 seals one end of the tubular housing 1 and provides an inlet 4 of the device. In one embodiment of the device, the inlet 4 takes the form of a tapered fitting, for instance, a Luer taper. Hollow fiber membrane 2 is joined to connector 3 at fitting 5. The second end 6 of hollow fiber membrane 2 is sealed, e.g., by crimping. The second end of the tubular housing 1 is open and provides an outlet 7 to the device. In some embodiments within the scope of the present disclosure, the outlet 7 is joined to the inlet of a fluid container, e.g., a drum, a bottle, an ampulla, or a bag. In other embodiments within the scope of the present disclosure, the outlet 7 is equipped with a connector; a joint; or a fitting, for instance, a tapered fitting, e.g., a Luer taper.

In one embodiment within the scope of the present disclosure, the outlet 7 is fluidly connected to a sterile fluid container. A solution may enter the inlet 4 of the device and pass through the connector 3 into the hollow fiber membrane 2. The solution then filters through the hollow fiber membrane 2 out a filter outlet 7 into the sterile container fluidly connected to the outlet 7. The device provides an isolated fluid connection between the inlet 4 and the container, such that once the solution is filtered through the membrane, the filtered solution passes directly into the sterilized environment of the container. The part of the housing 1 between the outlet 7 of the filter and an inlet of the container may be configured as a cut and seal area. Once the solution has been filtered into the container, the connection between the outlet 7 of the filter and an inlet of the container may be sealed and the filter device cut off upstream of the sealed area.

In one version of the filter device shown in FIG. 1, the hosing 1 surrounds the hollow fiber membrane 2 in a generally concentric configuration. Filtered fluid exiting the hollow fiber membrane 2 is contained within the housing 1 and ultimately passed through outlet 7. A hollow connector 3 secures the housing 1 and the hollow fiber membrane 2 together. The open inlet end 4 of the filter device is sealingly connected to fitting 5 which constitutes an open outlet end of the hollow connector 3. The connection may be achieved by gluing the open inlet end of the hollow fiber membrane 2 to the fitting 5 of the connector 3 with, for example, an epoxy resin, a polyurethane resin, a cyanoacrylate resin, or a solvent for the material of the hollow connector 3 such as cyclohexanone or methyl ethyl ketone (MEK). In the version depicted, the fitting 5 of the connector 3 comprises a hollow cylindrical member that fits inside of and is fixed to the open inlet end of the hollow fiber membrane 2. As such, a diameter of the fitting 5 of the connector 3 is substantially similar to or slightly smaller than an inner diameter of the hollow fiber membrane 2. The open inlet end of the hollow fiber membrane 2 may be welded to the open outlet end 5 of the connector 3 by, for example, laser welding if the hollow connector 3 is made from a material that absorbs laser radiation, mirror welding, ultrasound welding, or friction welding. In other versions, the internal diameter of the fitting 5 of the connector 3 is slightly larger than an outer diameter of the hollow fiber membrane 2, and the open inlet end of the hollow fiber membrane 2 is inserted into the fitting 5 of the connector 3. The open inlet end of the hollow fiber membrane 2 may be welded to the fitting 5 of the connector 3 by, for example, heat welding (e.g., introducing a hot conical metal tip into the open inlet end 4 of the connector 3 to partially melt the inside of the fitting 5 of the connector 3), laser welding if the hollow connector 3 is made from a material that absorbs laser radiation, mirror welding, ultrasound welding, or friction welding.

In an alternative embodiment, the hollow fiber membrane 2 is inserted into a mold, and a thermoplastic polymer is injection-molded around it to form the hollow connector 3. In one embodiment, both the connector 3 and the housing 1 are formed by injection-molding a thermoplastic polymer around the hollow fiber membrane 2.

The hollow connector 3 further includes a fluid inlet 4. A fluid can be fed via a connected fluid supply line, for example, into the fluid inlet 4 of the hollow connector 3. In some versions, the fluid inlet 4 can include a Luer lock type fitting or other standard medical fitting. The housing 1 is attached to a sealing surface of the hollow connector 3. The sealing surface in this version is cylindrical and has a diameter larger than a diameter of the fitting 5, and is disposed generally concentric with the fitting 5. In fact, in this version, the diameter of the sealing surface is generally identical to or slightly smaller than an inner diameter of the housing 1. So configured, the housing 1 receives the sealing surface and extends therefrom to surround and protect the hollow fiber membrane 2 without contacting the surface of the hollow fiber membrane 2. The housing 1 can be fixed to the sealing surface with adhesive, epoxy, welding, bonding, etc. The housing 1 receives the fluid after it passes through the pores of the hollow fiber membrane 2. From there, the now filtered fluid passes into the container.

In one version of the foregoing assembly of FIG. 1, the housing 1 includes an internal diameter that is larger than an external diameter of the hollow fiber membrane 2, and the housing 1 includes a longitudinal dimension that is larger than a longitudinal dimension of the hollow fiber membrane 2. As such, when the housing 1 and hollow fiber membrane 2 are assembled onto the connector 3, the hollow fiber membrane 2 resides entirely within (i.e., entirely inside of) the housing 1 and a gap exists between the internal sidewall of the housing 1 and the external sidewall of the hollow fiber membrane 2. As such, solution passing into the hollow fiber membrane 2 passes out of the pores of hollow fiber membrane 2 and flows without obstruction through the gap and along the inside of the housing 1 to the container. In some versions, the housing 1 can be a flexible tube, a rigid tube, or can include a tube with portions that are flexible and other portions that are rigid. Specifically, in some versions, a housing 1 with at least a rigid portion adjacent to the hollow fiber membrane 2 can serve to further protect the hollow fiber membrane 2 and/or prevent the hollow fiber membrane 2 from becoming pinched or kinked in a flexible tube. In other versions, such protection may not be needed or desirable. In one embodiment, the housing 1 has an internal diameter which is from 0.2 to 3 mm larger than the outer diameter of hollow fiber membrane 2, and a longitudinal dimension which is from 1 to 5 cm longer than then length of the hollow fiber membrane 2. In one embodiment, the hollow fiber membrane 2 has an outer diameter in the range of approximately 2.3 mm to approximately 5 mm, a longitudinal dimension in the range of approximately 3 cm to approximately 20 cm, and a wall thickness in the range of approximately 150 µm to approximately 500 µm. The pore size of the hollow fiber membrane 2, coupled with the disclosed geometrical dimension of the housing 1 and hollow fiber membrane 2, ensure acceptable flow rates through the hollow fiber membrane 2 for filling the container, for instance, a product bag with patient injectable solutions such as sterile water, sterile saline, etc. In other versions, any or all of the dimensions could vary depending on the specific application.

Suitable materials for the housing 1 include PVC; polyesters like PET or PETG; poly(meth)acrylates like PMMA; polycarbonates (PC); polyolefins like PE, PP, or cycloolefin copolymers (COC); polystyrene (PS); silicone polymers, etc.

The membrane and the filtration device of the present disclosure may advantageously be used to remove particles from a liquid. Examples of particles that may be removed include microorganisms like bacteria; solids like undissolved constituents of a solution (e.g., salt crystals or agglomerates of active ingredients), dust particles, or plastic particles generated during manufacture by abrasion, welding etc. When the filtration device incorporates a membrane bearing cationic charges, it is also able to remove endotoxins and bacterial DNA from a liquid.

In one embodiment intended to be covered by the scope of the present disclosure, the device of the present disclosure forms part of an infusion line for injecting fluid into a patient, e.g., into the bloodstream or the peritoneum of the patient. Examples of such fluids include sterile medical fluids like saline, drug solutions, glucose solutions, parenteral nutrition solutions, substitution fluids supplied to the patient in the course of hemodiafiltration or hemofiltration treatments, or dialysis fluids supplied to the patient in the course of peritoneal dialysis (PD) treatments. The device of the present disclosure forms a final sterile barrier for the fluid entering the bloodstream or the peritoneum, respectively, of the patient.

A further aspect of the present disclosure is a method of removing particles from a liquid, comprising filtration of the liquid through the filtration device of the present disclosure. The filtration is normal-flow filtration (NFF), which is also called dead-end or direct flow filtration. As the membrane of the present disclosure does not have a skin, it is possible to perform both inside-out and outside-in filtration with it.

Examples of suitable liquids that can be filtered with the device of the present disclosure include medical liquids like sterile water, saline, drug solutions, dialysis fluid, substitution fluid, parenteral nutrition fluids etc.

ELEMENT NUMBER LISTING

1—housing
2—hollow fiber membrane
3—connector
4—filter inlet
5—fitting
6—sealed end of hollow fiber membrane
7—filter outlet
11—mini module feed inlet
12—mini module filtrate outlet
13—mini module retentate outlet
14—pressure regulator
15—pressure sensor equipped with data logger
21—Challenge suspension
22—Peristaltic pump
23—Pressure monitor pre-filtration
24—Single fiber filter inlet port
25—Single fiber filter outlet port
26—Filtrate collection bottle Methods
Capillary Flow Porometry A POROLUX™ 1000 (POROMETER N.V., 9810 Eke, Belgium) is used for these measurements; Porefil® wetting fluid is used as low surface tension liquid.

The POROLUX™ 1000 series uses a pressure step/stability method to measure pore diameters. The inlet valve for the gas is a large, specially designed needle valve that is opened with very accurate and precise movements. To increase pressure, the valve opens to a precise point and then stops its movement. The pressure and flow sensors will only take a data point when the used defined stability algorithms are met for both pressure and flow. In this way, the POROLUX™ 1000 detects the opening of a pore at a certain pressure and waits until all pores of the same diameter are completely opened before accepting a data point. This results in very accurate measurement of pore sizes and allows a calculation of the real pore size distribution. The POROLUX™ 1000 measures mean flow pore size. Measurable pore size ranges from ca. 13 nm to 500 µm equivalent diameter (depending on the wetting liquid).

The hollow fiber samples were cut into pieces of 8 cm; and one end of each piece was sealed by crimping. These were glued into a module with epoxy resin and measured with the POROLUX™ 1000. The effective fiber length after potting was about 5 cm.

At differential gas pressure the flow rates through wet and dry membranes were measured. Before measurement the membrane was immersed in a low surface tension liquid (Porefil®, 16 dyne/cm) to ensure that all pores including the small ones are filled with the wetting liquid. By measuring the pressure at which the liquid is pressed out of the pores, its corresponding diameter can be calculated using the Laplace equation.

Laplace Equation:

$$Dp = 4Y \cos \theta / \Delta P$$

Dp=diameter pores [m]
Y=surface tension [N/m]; for Porefil® 0.016 [N/m]
ΔP=pressure [Pa]
Cos θ=contact angle; by complete wetting cos θ=1

The flow rate was measured at a certain pressure over the wet and over the dry membrane, resulting in a wet curve, a dry curve, and a half dry curve in between. The point where the half dry curve crosses the wet curve is the mean flow pore size. The pore size is calculated via the first derivative from the flow pressure. All measurements were carried out in two independent, different modules, duplicate measurements were made.

Preparation of Mini-Modules

Mini-modules [=fiber in a housing] are prepared by cutting the fiber to a length of 20 cm, drying the fiber for 1 h at 40° C. and <100 mbar and subsequently transferring the fiber into the housing. The ends of the fiber are closed using a UV-curable adhesive. The mini-module is dried in a vacuum drying oven at 60° C. over night, and then the ends of the fiber are potted with polyurethane. After the polyurethane has hardened, the ends of the potted membrane bundle are cut to reopen the fibers. The mini-module ensures protection of the fiber.

Hydraulic Permeability (Lp) of Mini-Modules

The hydraulic permeability of a mini-module is determined by pressing a defined volume of water under pressure through the mini-module, which has been sealed on one side, and measuring the required time. The hydraulic permeability is calculated from the determined time t, the effective membrane surface area A, the applied pressure p and the volume of water pressed through the membrane V, according to equation (1):

$$Lp = V/[p \cdot A \cdot t] \tag{1}$$

The effective membrane surface area A is calculated from the fiber length and the inner diameter of the fiber according to equation (2)

$$A = \pi \cdot d_i \cdot l \cdot [\text{cm}^2] \tag{2}$$

with
$d_i$=inner diameter of fiber [cm]
l=effective fiber length [cm]

The mini-module is wetted thirty minutes before the Lp-test is performed. For this purpose, the mini-module is put in a box containing 500 mL of ultrapure water. After 30 minutes, the mini-module is transferred into the testing system. The testing system consists of a water bath that is maintained at 37° C. and a device where the mini-module can be mounted. The filling height of the water bath has to ensure that the mini-module is located underneath the water surface in the designated device.

In order to avoid that a leakage of the membrane leads to a wrong test result, an integrity test of the mini-module and the test system is carried out in advance. The integrity test is performed by pressing air through the mini-module that is closed on one side. Air bubbles indicate a leakage of the mini-module or the test device. It has to be checked if the leakage is due to an incorrect mounting of the mini-module in the test device or if the membrane leaks. The mini-module has to be discarded if a leakage of the membrane is detected. The pressure applied in the integrity test has to be at least the same value as the pressure applied during the determination of the hydraulic permeability in order to ensure that no leakage can occur during the measurement of the hydraulic permeability because the pressure applied is too high.

Burst Pressure

Before testing the burst pressure, an integrity test followed by measurement of the hydraulic permeability (Lp) is performed on the mini-module as described above.

Figure 2:
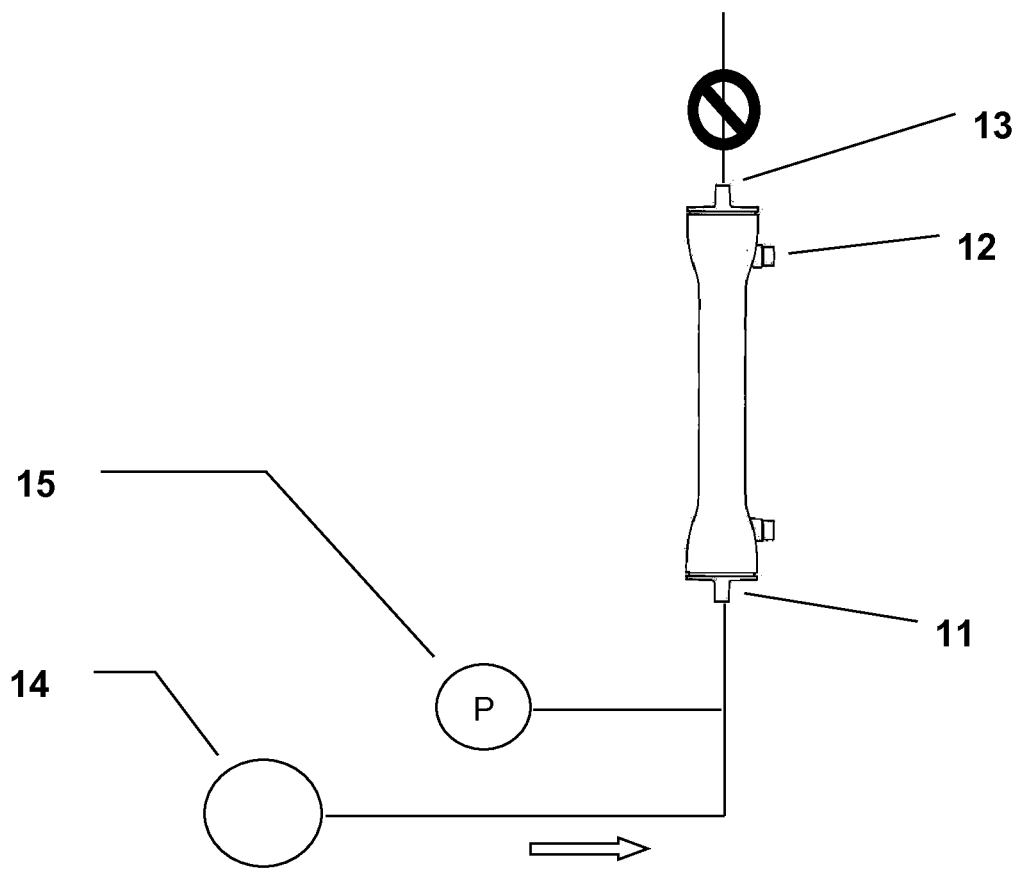
FIG. 2 shows a set-up for determining the burst pressure of a hollow fiber membrane.
Figure 3:
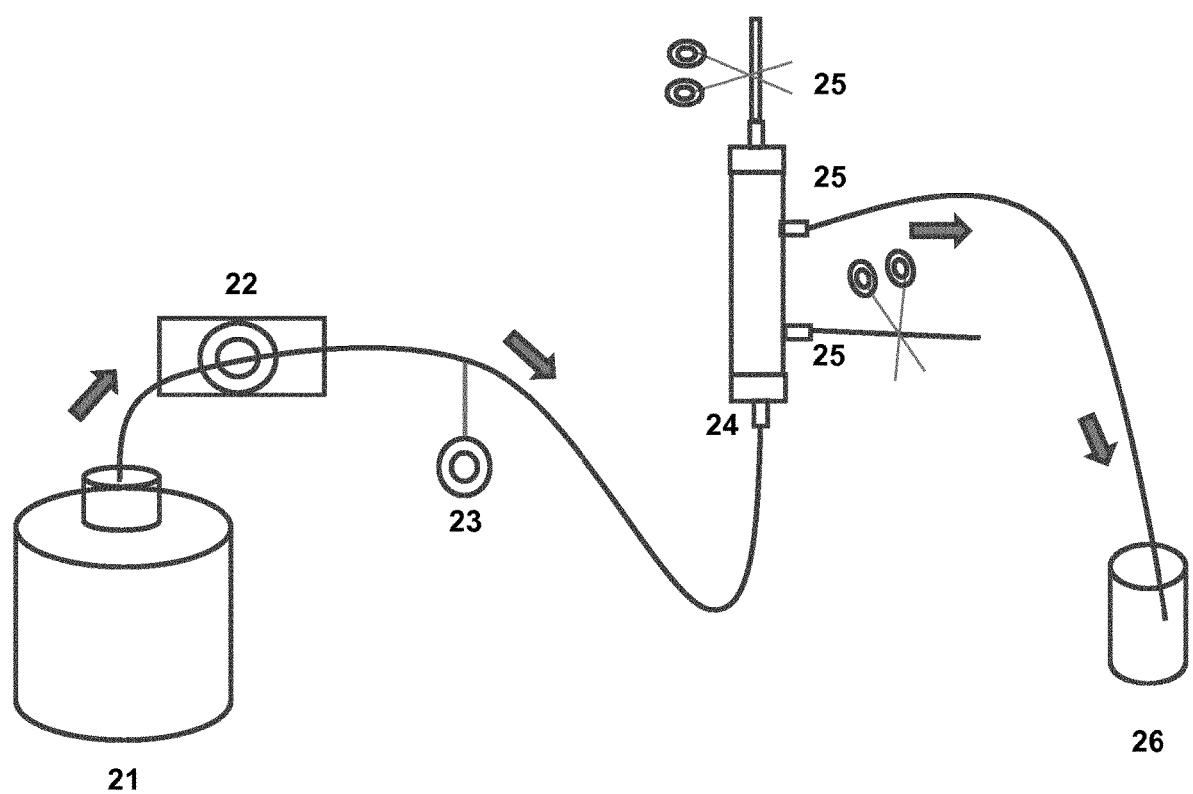
FIG. 3 shows a set-up for determining bacterial and endotoxin log reduction values (LRV) of filter devices according to the present disclosure

The set-up for the burst pressure test is shown in FIG. 2.

The feed 11 and the filtrate sides 12 are purged using compressed air having 0.5 bar gauge pressure.

The tubing is glued to the mini module's feed 11 and retentate 13 connectors using cyclohexanone and a UV-curing adhesive.

The mini-module then is connected to the pressure regulator 14 and the retentate connector (3 is closed. The pressure sensor equipped with a data logger 15 is connected. The filtrate connectors 12 stay open.

The measurement is started (logging interval 3 sec.).

Using pressure regulator 14, the test pressure is set to an initial value, e.g., 2 bar (g) and kept for 1 minute.

Subsequently, the pressure is increased by 0.1 bar every minute until the fibers burst. The burst is audible and at the same time a slight pressure decrease is observed.

The test is passed if the fibers withstand 7 bar (g) without bursting.

At the end of the test, the data from the data logger is read out and the burst pressure is determined.

Bacterial and Endotoxin Log Reduction Value (LRV)

LRV of the membranes was tested with suspensions of *Brevundimonas diminuta* (BD) ATCC 19146 according to the following procedure:

A. Preparation of BD Bacterial Challenge Suspension

It is important that the method for production of BD pass the criteria set forth in ASTM F838-05 (reapproved 2013) and that the challenge suspension reach a challenge of $\geq 10^7$ CFU/cm$^2$ membrane area.

1. From a stock culture of *Brevundimonas diminuta* (BD) ATCC 19146, inoculate 3 Trypticase Soy Agar (TSA) plates and incubate at 28-34° C. for 48±2 hours.
2. From the BD TSA plates (section A step 1, not older than one week), remove several colonies of BD growth and suspend in Trypticase Soy Broth (TSB). Spectrophotometrically adjust the suspension to >1.0 Absorbance at 625 nm wavelength.
3. Add 12 mL of this adjusted suspension into a sterile 150 mL polystyrene bottle containing 120 mL TSB. Mix the bottle thoroughly and incubate at 28-34° C. for 24±2 hours.
4. Remove the TSB bottle from 28-34° C.
5. Prepare 1-1 L flask containing 0.5 L of SLB. Place the flask at room temperature overnight.
6. Inoculate 1-1 L flask containing 0.5 L SLB with 2 mL of BD per flask from A 4. Swirl to mix inoculum. Check for purity in the TSB by inoculating onto a TSA plate and incubating at 28-34° C. for 24-48 hours.
7. Incubate the inoculated flask (with loosened caps) at 28-34° C. for 48±2 hours while shaking at 50 rpm. Note—The SLB suspension may be stored at 5° C. for up to 8 hours prior to use.
8. Mix the flask and add 10 mL to a flask containing 990 mL of sterile—this is the BD challenge suspension. The will be made for every filter tested.
9. Remove a sample to check the concentration of the BD challenge suspension by use of the plate count method.
10. Prepare serial 1:10 dilutions in sterile water to $10^{-1}$. Prepare duplicate 1 mL TSA pour plates from $10^{-2}$, $10^{-3}$, $10^{-4}$ and $10^{-5}$ dilutions. Incubate pour plates at 28-34° C. for up to 72 hours. The expected concentration is 106 CFU/mL.

B. Test Procedure for Controlling the BD Bacterial Challenge Suspension

To determine if the colonies are monodispersed, the BD challenge organism will be tested with membrane filtration on filters with pore size 0.45 μm and microscopically.

1. Take a sample from the 1 L BD challenge flask. If the sample will not be processed right away, store the sample at 2-8° C.
2. Filter 1 mL through a 0.45 μm membrane filter and rinse with a volume of sterile water equal to or greater than the volume filtered. The filtrate will be collected in a sterile bottle.
3. Filter the filtrate through a 0.2 μm membrane filter.
4. Rinse the filter with a volume of sterile water equal to or greater than the volume filtered.
5. Aseptically place the 0.2 μm membrane filter on a TSA plate and incubate at 28-34° C. for up to 72 hours.
6. The size control of BD should show growth in the filtrate from the 0.45 μm filter.
7. Colonies of BD are yellow-beige, slightly convex, complete and shiny.
8. Take a sample from the BD challenge suspension and perform a gram stain. The BD challenge suspension shall consist of predominantly single cells and should reveal a gram negative, rod-shaped organism about 0.3 to 0.4 μm by 0.6 to 1.0 μm in size.
9. Take a 40 mL sample from the original BD challenge suspensions and transfer to a 50 mL centrifuge tube. Centrifuge at 3,000 rpm for 10 minutes. Pour off supernatant and add 10 mL 2% Glutaraldehyde in 0.1 M Cacodylate buffer. Vortex centrifuge tube and deliver to William Graham for SEM.

C. Test Procedure for Challenging the Single Fiber Filter

The challenge of the filter shall be performed at 19-24° C. The set-up for the test is shown in FIG. 3.

1. Prepare the BD challenge suspension according to section A step 8.
2. Sterilize tubing and single fiber filter (filter line tubing sets with attached tubing, required tubing connection for pressure gauge) and disinfect any accessories if unable to steam sterilize. Set-up pump, clamp and pressure gauge.
3. Take a sample from the BD challenge suspension to check the concentration by use of the plate count method (see section A 8).
4. Set up the single fiber filter for the test.
5. Aseptically place the single fiber filter inlet line in a sterile nonpyrogenic bottle, through the pump and into a flask containing sterile water and start the pump. Prime the line and validate pump flow rates (150, 255 and 500 mL/min) using a calibrated scale and timer. Aseptically connect the inlet line, waste line and outlet lines to the single fiber filter. Hemostat the single fiber filter outlet lines. Remove approximately 5 mL of priming solution from the sterile water flask for endotoxin analysis and store at 2-8° C.
6. Start the pump (152.6 mL/min for filter 1, 253.7 mL/min for filter 2 and 489.4 mL/min for filter 3) in order to remove the air from inside the single fiber. Test for sterilant residuals if used. They must be 0 ppm before going to step 7. If not, continue priming with sterile water until residual sterilant is 0 ppm.
7. Stop the pump and hemostat the single fiber filter waste line. Remove the hemostat from the single fiber filter outlet lines. Start the pump again (at flow rates from step 6 above) in order to remove the air from the single fiber filter outlet lines. Test for sterilant residuals if used. They must be 0 ppm before going to step 8. If not, continue priming with sterile water until residual sterilant is 0 ppm.
8. Stop the pump and hemostat the single fiber filter outlet line closest to the inlet line. Start the pump again (at flow rates from step 6 above). Place an empty 1 L sterile bottle onto a balance and tare. Aseptically collect the 1 L priming solution into a sterile bottle from the single fiber filter outlet line; this will be called Prime/Negative control. Stop the pump. Remove approximately 5 mL of priming solution from the 1 L bottle for endotoxin analysis and store at 2-8° C. Filter the remaining priming solution through 0.2 μm membrane filter. Rinse membrane filter with sterile water equal to the total volume of the filtration unit. Aseptically place the membrane filter onto a TSA plate and incubate at 28-34° C. for up to 72 hours.
9. Hemostat the single fiber filter inlet line and aseptically move the single fiber filter inlet line into the BD challenge suspension (see section A step 8). Remove the hemostat from the single fiber filter inlet line and start the pump. Challenge the single fiber filter with the approximately 1 L of the BD challenge suspension at a flow rates from step 6 above.
10. Place an empty 1 L sterile bottle onto a balance and tare. Start the pump and remove the hemostat from the single fiber filter outlet line. Collect the filtrate and measure the pressure toward the end of the 1 L challenge. This will be called Test Filtrate.
11. After collection of the approximately 1 L, Stop the pump and hemostat the single fiber filter inlet and outlet lines. Transfer the single fiber filter inlet line into a flask containing approximately 1 L sterile water. Remove the hemostats from the single fiber filter inlet and outlet lines. Start the pump and rinse the single fiber filter with 1 L of sterile water at a flow rates flow from step 6 above. Clamp off all lines on the single fiber filter and store at 2-8° C.
12. In a Biological Safety Cabinet, mix the Test Filtrate and remove approximately 5 mL for endotoxin analysis and store at 2-8° C. Filter the Test Filtrate in aliquots of 1 mL, 10 mL, 100 mL and the rest through an analytical membrane filter with pore size 0.2 μm. Rinse membrane filters with sterile water equal to the total volume of the filtration unit.
13. Aseptically place the membrane filters onto TSA plates.
14. Incubate the TSA plates in 28-34° C. Record the number of colonies observed at approximately 48 hrs (greater than 48 hrs if over the weekend) and at 7 days.
15. If colonies appear on the membrane filters, perform a gram stain on the colonies. If the gram stain shows anything other than gram negative rods, report as contamination. If the gram stain shows gram negative rods, compare the growth to the BD challenge growth to determine if the same organism.
16. Calculate a log reduction value (LRV) for bacteria, see section D step 1.
17. Calculate a log reduction value (LRV) for endotoxin, see section D step 2.

D. Calculation of LRV
1. A bacterial log reduction value (LRV) will be calculated for each of the three (3) single fiber filters.
   Bacterial LRV=log 10 (total CFU in challenge/total CFU in filtrate)
2. An endotoxin log reduction value (LRV) will be calculated for each of the three (3) single fiber filters.
   Endotoxin LRV=log 10 (total EU in challenge/total EU in filtrate)

E. Negative Filtration Control
1. In a biosafety cabinet, shake sterile water bottle to mix. The sterile water will be the same lot as used in rinsing the day's samples.
2. Place an analytical membrane filter with pore size 0.2 μm onto manifold.
3. Filter 100 mL and 300 mL of sterile water under vacuum.
4. Aseptically place the membrane filters TSA plates.
5. Incubate the TSA plates in 28-32° C. Record the number of colonies observed at approximately 48 hrs (greater than 48 hrs if over the weekend) and 7 days.
   The negative control membrane filters should show no growth.
   The size control of BD should show growth in the filtrate from the 0.45 μm membrane filter.
   The size of the BD organism should be 0.3-0.4 μm in width and 0.6-1.0 μm in length.

EXAMPLES

Additive 1: block copolymer of ethylene oxide and epichlorohydrin, reacted with 40 mol %, in relation to the chloride groups in the copolymer, of 1,4-diazabicyclo[2.2.2]octane; having a number average molecular weight of 150 to 200 kDa;
Additive 2: polyvinylpyridine having a weight average molecular weight of 150 to 200 kDa, comprising 5 mol %, based on the pyridine moieties in the polymer, of N-alkylpyridinium groups; the counter ion is sulfate.

Example 1

A solution of 19% w/w polyethersulfone having a weight average molecular weight of about 75 kDa (Ultrason® 6020, BASF SE); 6.5% w/w PVP having a weight average molecular weight of about 1,100 kDa (Luvitec® K85, BASF SE); 6% w/w PVP having a weight average molecular weight of about 50 kDa (Luvitec® K30, BASF SE); and 0.1% w/w of Additive 1; in 5% w/w water and 63.4% w/w NMP was thermostatted at 75° C. and extruded through the outer ring slit of a spinneret with two concentric openings, the outer opening having an outer diameter of 2,700 μm and an inner diameter of 1,900 μm; the inner opening having a diameter of 1,700 μm; into a coagulation bath containing water. A solution containing 40% w/w water and 60% w/w NMP was used as the center fluid and extruded through the inner opening of the spinneret. The temperature of the spinneret was 53° C.; the temperature of the coagulation bath was 89° C. and the air gap 52.5 cm. The fibers were spun at a speed of 9.5 m/min.

The fibers subsequently were washed with demineralized water at 70° C. and dried for 150 min at 50° C. under a constant flow of dry air. The fiber obtained had an inner diameter of 3,385 μm and a wall thickness of 196 μm. A portion of the fibers was sterilized with steam at 121° C. for 21 min, another portion of the fibers was sterilized with gamma radiation at a dose of >25 kGy. Mean flow pore size was determined to be 478 nm for the steam-sterilized fibers, and 485 nm for the gamma-sterilized fibers.

Mini-modules were prepared as described above and hydraulic permeability of the fibers and burst pressure was tested as described above.

The mini-module comprising a non-sterilized fiber showed an Lp of $81 \cdot 10^{-4}$ cm$^3$/(cm$^2 \cdot$bar$\cdot$sec).

The mini-module comprising a steam-sterilized fiber showed an Lp of $1038 \cdot 10^{-4}$ cm$^3$/(cm$^2 \cdot$bar$\cdot$sec).

The mini-module comprising a gamma-sterilized fiber showed an Lp of $1,372 \cdot 10^{-4}$ cm$^3$/(cm$^2 \cdot$bar$\cdot$sec).

Burst pressure was determined to be 2.5 bar (g) for the steam-sterilized fibers; and 2.3 bar (g) for the gamma-sterilized fibers.

Endotoxin LRV for the mini-modules comprising a steam-sterilized fiber was determined to be >3.9. Endotoxin LRV for the mini-modules comprising a gamma-sterilized fiber was determined to be >3.9.

Bacterial LRV for the mini-modules comprising a steam-sterilized fiber was determined to be >9. Bacterial LRV for the mini-modules comprising a gamma-sterilized fiber was determined to be >9.

Example 2

A solution of 19% w/w polyethersulfone having a weight average molecular weight of about 75 kDa (Ultrason® 6020, BASF SE); 6.5% w/w PVP having a weight average molecular weight of about 1,100 kDa (Luvitec® K85, BASF SE); 6% w/w PVP having a weight average molecular weight of about 50 kDa (Luvitec® K30, BASF SE); and 0.3% w/w of Additive 1; in 5% w/w water and 63.2% w/w NMP was thermostatted at 75° C. and extruded through the outer ring slit of a spinneret with two concentric openings, the outer opening having an outer diameter of 2,700 μm and an inner diameter of 1,900 μm; the inner opening having a diameter of 1,700 μm; into a coagulation bath containing water. A solution containing 40% w/w water and 60% w/w NMP was used as the center fluid and extruded through the inner opening of the spinneret. The temperature of the spinneret was 53° C.; the temperature of the coagulation bath was 89° C. and the air gap 52.5 cm. The fibers were spun at a speed of 9.5 m/min.

The fibers subsequently were washed with demineralized water at 70° C. and dried for 150 min at 50° C. under a constant flow of dry air. The fiber obtained had an inner diameter of 3,373 μm and a wall thickness of 193 μm. A portion of the fibers was sterilized with steam at 121° C. for 21 min, another portion of the fibers was sterilized with gamma radiation at a dose of >25 kGy. Mean flow pore size was determined to be 577 nm for the steam-sterilized fibers, and 575 nm for the gamma-sterilized fibers.

Mini-modules were prepared as described above and hydraulic permeability of the fibers and burst pressure was tested as described above.

The mini-module comprising a non-sterilized fiber showed an Lp of $176 \cdot 10^{-4}$ cm$^3$/(cm$^2 \cdot$bar$\cdot$sec).

The mini-module comprising a steam-sterilized fiber showed an Lp of $1,721 \cdot 10^{-4}$ cm$^3$/(cm$^2 \cdot$bar$\cdot$sec).

The mini-module comprising a gamma-sterilized fiber showed an Lp of $3,208 \cdot 10^{-4}$ cm$^3$/(cm$^2$ bar$\cdot$sec).

Burst pressure was determined to be 2.3 bar (g) for the gamma-sterilized fibers.

Endotoxin LRV for the mini-modules comprising a steam-sterilized fiber was determined to be >3.8. Endotoxin LRV for the mini-modules comprising a gamma-sterilized fiber was determined to be >3.8.

Bacterial LRV for the mini-modules comprising a steam-sterilized fiber was determined to be >9. Bacterial LRV for the mini-modules comprising a gamma-sterilized fiber was determined to be >9.

Example 3

A solution of 19% w/w polyethersulfone having a weight average molecular weight of about 75 kDa (Ultrason® 6020, BASF SE); 6% w/w PVP having a weight average molecular weight of about 1,100 kDa (Luvitec® K85, BASF SE); 6% w/w PVP having a weight average molecular weight of about 50 kDa (Luvitec® K30, BASF SE); and 0.3% w/w of Additive 2 in 5% w/w water and 63.7% w/w NMP was thermostatted at 75° C. and extruded through the outer ring slit of a spinneret with two concentric openings, the outer opening having an outer diameter of 2,700 µm and an inner diameter of 1,900 µm; the inner opening having a diameter of 1,700 µm; into a coagulation bath containing water. A solution containing 40% w/w water and 60% w/w NMP was used as the center fluid and extruded through the inner opening of the spinneret. The temperature of the spinneret was 53° C.; the temperature of the coagulation bath was 90° C. and the air gap 52.5 cm. The fibers were spun at a speed of 9.5 m/min.

The fibers subsequently were washed with demineralized water at 70° C. and dried for 150 min at 50° C. under a constant flow of dry air. The fiber obtained had an inner diameter of 3,366 µm and a wall thickness of 189 µm. A portion of the fibers was sterilized with steam at 121° C. for 21 min, another portion of the fibers was sterilized with gamma radiation at a dose of >25 kGy. Mean flow pore size was determined to be 577 nm for the steam-sterilized fibers, and 576 nm for the gamma-sterilized fibers.

Mini-modules were prepared as described above and hydraulic permeability of the fibers and burst pressure was tested as described above.

The mini-module comprising a non-sterilized fiber showed an Lp of $296 \cdot 10^{-4}$ cm$^3$/(cm$^2 \cdot$bar$\cdot$sec).

The mini-module comprising a steam-sterilized fiber showed an Lp of $2,796 \cdot 10^{-4}$ cm$^3$/(cm$^2$ bar$\cdot$sec).

The mini-module comprising a gamma-sterilized fiber showed an Lp of $3,233 \cdot 10^{-4}$ cm$^3$/(cm$^2$ bar$\cdot$sec).

Burst pressure was determined to be 2.8 bar (g) for the steam-sterilized fibers; and 2.5 bar (g) for the gamma-sterilized fibers.

Endotoxin LRV for the mini-modules comprising a steam-sterilized fiber was determined to be >3.6. Endotoxin LRV for the mini-modules comprising a gamma-sterilized fiber was determined to be >3.6.

Bacterial LRV for the mini-modules comprising a steam-sterilized fiber was determined to be >9. Bacterial LRV for the mini-modules comprising a gamma-sterilized fiber was determined to be >9.

Example 4

A solution of 19% w/w polyethersulfone having a weight average molecular weight of about 75 kDa (Ultrason® 6020, BASF SE); 6.5% w/w PVP having a weight average molecular weight of about 1,100 kDa (Luvitec® K85, BASF SE); 6% w/w PVP having a weight average molecular weight of about 50 kDa (Luvitec® K30, BASF SE); and 0.2% w/w of Additive 2; in 5% w/w water and 63.3% w/w NMP was thermostatted at 75° C. and extruded through the outer ring slit of a spinneret with two concentric openings, the outer opening having an outer diameter of 2,700 µm and an inner diameter of 1,900 µm; the inner opening having a diameter of 1,700 µm; into a coagulation bath containing water. A solution containing 40% w/w water and 60% w/w NMP was used as the center fluid and extruded through the inner opening of the spinneret. The temperature of the spinneret was 53° C.; the temperature of the coagulation bath was 89° C. and the air gap 52.5 cm. The fibers were spun at a speed of 9.5 m/min.

The fibers subsequently were washed with demineralized water at 70° C. and dried for 150 min at 50° C. under a constant flow of dry air. The fiber obtained had an inner diameter of 3,347 µm and a wall thickness of 199 µm. A portion of the fibers was sterilized with steam at 121° C. for 21 min, another portion of the fibers was sterilized with gamma radiation at a dose of >25 kGy. Mean flow pore size was determined to be 519 nm for the steam-sterilized fibers, and 520 nm for the gamma-sterilized fibers.

Mini-modules were prepared as described above and hydraulic permeability of the fibers and burst pressure was tested as described above.

The mini-module comprising a non-sterilized fiber showed an Lp of $164 \cdot 10^{-4}$ cm$^3$/(cm$^2 \cdot$bar$\cdot$sec).

The mini-module comprising a steam-sterilized fiber showed an Lp of $1,453 \cdot 10^{-4}$ cm$^3$/(cm$^2 \cdot$bar$\cdot$sec).

The mini-module comprising a gamma-sterilized fiber showed an Lp of $3,856 \cdot 10^{-4}$ cm$^3$/(cm$^2 \cdot$bar$\cdot$sec).

Burst pressure was determined to be 2.5 bar (g) for the gamma-sterilized fiber.

Endotoxin LRV for the mini-modules comprising a steam-sterilized fiber was determined to be >3.6. Endotoxin LRV for the mini-modules comprising a gamma-sterilized fiber was determined to be >3.6.

Bacterial LRV for the mini-modules comprising a steam-sterilized fiber was determined to be >9. Bacterial LRV for the mini-modules comprising a gamma-sterilized fiber was determined to be >9.

The invention claimed is:
1. A porous hollow fiber membrane comprising i) polyethersulfone; ii) polyvinylpyrrolidone; and iii) a polymer bearing ammonium groups, wherein the polymer bearing ammonium groups is selected from the group consisting of polyalkyleneoxides bearing ammonium groups obtained by reaction of a tertiary amine with a copolymer of ethylene oxide and epichlorohydrin,
wherein the polymer bearing ammonium groups corresponds to the formula

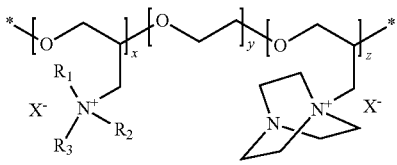

wherein
$R_1$, $R_2$, and $R_3$ are individually selected from H, alkyl, and benzyl; and
$X^-$ is $Cl^-$;
with
$0 \leq x \leq 0.9$;
$0 \leq y \leq 0.8$;
$0 \leq z \leq 0.9$;
and $x+y+z=1$,
polyvinylpyridines bearing ammonium groups obtained by a reaction of a polyvinylpyridine with an alkylating agent selected from the group consisting of dimethyl sulfate and diethyl sulfate, and copolymers of vinylpyridine and styrene bearing ammonium groups obtained by reaction of a copolymer of vinylpyridine and styrene with an alkylating agent and corresponding to the formula

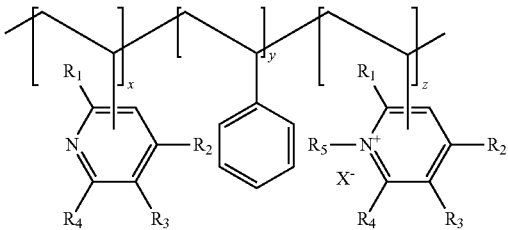

wherein
$R_1$, $R_2$, $R_3$, and $R_4$ are individually selected from H, alkyl, and benzyl;
$R_5$ is selected from alkyl and benzyl; and
$X^-$ is selected from $Cl^-$, $Br^-$, and $SO_4^{2-}$;
with
$0 \leq x < 1$;
$0 < y \leq 0.5$;
$0 < z \leq 0.5$;
and $x+y+z=1$,
wherein the membrane has a sponge-like structure, and wherein the membrane comprises a mean flow pore size, determined by capillary flow porometry, which is larger than about 0.2 μm.

2. The membrane of claim 1, wherein the membrane comprises an inner diameter between about 2,300 μm to about 4,000 μm and a wall strength between about 150 μm to about 500 μm; wherein the ratio of the inner diameter to the wall strength is larger than about 10.

3. The membrane of claim 2, wherein the inner diameter is between about 2,900 μm to about 3,400 μm and the wall strength is between about 180 μm to about 320 μm.

4. The membrane of claim 1, wherein the membrane comprises a burst pressure of at least 2.0 bar (g).

5. The membrane of claim 1, wherein the membrane comprises an endotoxin log reduction value (LRV) of at least 3.

6. The membrane of claim 1, wherein the polymer bearing ammonium groups is the reaction product of a tertiary amine and a copolymer of ethylene oxide and epichlorohydrin.

7. The membrane of claim 1, wherein the polymer bearing ammonium groups is the reaction product of a polyvinylpyridine and an alkylating agent.

8. A continuous solvent phase inversion spinning process for preparing the porous hollow fiber membrane of claim 1, said process comprising the steps of a) dissolving i) the polyethersulfone, ii) the polyvinylpyrrolidone, and iii) the polymer bearing ammonium groups in N-methyl-2-pyrrolidone (NMP) to form a polymer solution;
b) extruding the polymer solution through an outer ring slit of a nozzle with two concentric openings into a precipitation bath; simultaneously
c) extruding a center fluid through the inner opening of the nozzle;
d) washing the membrane obtained; and subsequently
e) drying the membrane;
wherein the polymer solution comprises i) between about 15 wt % to about 20 wt %, relative to the total weight of the polymer solution, of polyethersulfone; ii) from 10 wt % to 15 wt %, relative to the total weight of the polymer solution, of polyvinylpyrrolidone; and iii) between about 0.03 wt % to about 2 wt %, relative to the total weight of the solution, of the polymer bearing ammonium groups.

9. The process of claim 8, wherein the polymer bearing ammonium groups is the reaction product of a tertiary amine and a copolymer of ethylene oxide and epichlorohydrin.

10. The process of claim 8, wherein the polymer bearing ammonium groups is the reaction product of a polyvinylpyridine and an alkylating agent.

11. The process of claim 8, wherein the center fluid comprises between about 35 wt % to about 50 wt % of water and between about 50 wt % to about 65 wt % of NMP, relative to the total weight of the center fluid.

12. The process of claim 8, wherein the precipitation bath has a temperature in the range of between about 70° C. to about 99° C.

13. The process of claim 8, wherein the membrane is sterilized with steam subsequent to drying.

14. The process of claim 8, wherein the membrane is sterilized with gamma radiation subsequent to drying.

15. A method of removing particles from a liquid, said method comprising the step of contacting the liquid with the porous hollow fiber membrane of claim 1, wherein the particles are removed from the liquid.

16. The method of claim 15, wherein the porous hollow fiber membrane is configured in a filtration device.

17. The method of claim 15, wherein the particles comprise bacteria.

18. The method of claim 15, wherein the particles comprise undissolved constituents of a solution.

19. The method of claim 15, wherein the particles comprise endotoxins.

20. The method of claim 15, wherein the particles comprise bacterial DNA.

* * * * *